United States Patent
Williams et al.

(10) Patent No.: US 9,801,216 B1
(45) Date of Patent: Oct. 24, 2017

(54) PEER-TO-PEER CONFIGURATION

(71) Applicant: Amazon Technologies, Inc., Seattle, WA (US)

(72) Inventors: Robert Williams, San Francisco, CA (US); Charles Louis Ward, Sammamish, WA (US); Amir Frenkel, San Jose, CA (US); Roger Robert Webster, Los Altos, CA (US); Andrew Jay Roths, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 178 days.

(21) Appl. No.: 14/675,207

(22) Filed: Mar. 31, 2015

(51) Int. Cl.
| | |
|---|---|
| *H04W 12/06* | (2009.01) |
| *H04W 76/02* | (2009.01) |
| *H04W 12/08* | (2009.01) |
| *H04W 84/12* | (2009.01) |
| *H04L 29/08* | (2006.01) |
| *H04L 29/06* | (2006.01) |

(52) U.S. Cl.
CPC ....... *H04W 76/023* (2013.01); *H04L 63/0428* (2013.01); *H04L 63/061* (2013.01); *H04L 67/1087* (2013.01); *H04W 12/06* (2013.01); *H04W 12/08* (2013.01); *H04W 76/021* (2013.01); *H04W 84/12* (2013.01)

(58) Field of Classification Search
CPC ... H04L 5/0069; H04L 5/0048; H04L 5/0073; H04L 5/0053; H04L 5/0035; H04L 5/0032
See application file for complete search history.

(56) References Cited

U.S. PATENT DOCUMENTS

| | | | | |
|---|---|---|---|---|
| 2006/0039332 | A1* | 2/2006 | Kotzin | H04W 36/14 370/338 |
| 2013/0031615 | A1* | 1/2013 | Woodward | H04W 8/02 726/4 |
| 2013/0217427 | A1* | 8/2013 | Bajko | H04W 48/14 455/507 |
| 2015/0319661 | A1* | 11/2015 | Jung | H04W 36/14 455/436 |
| 2015/0351022 | A1* | 12/2015 | Sakoda | H04W 8/005 370/329 |
| 2016/0073440 | A1* | 3/2016 | Pallen | H04W 76/025 370/329 |
| 2016/0180345 | A1* | 6/2016 | Canpolat | G06Q 30/00 705/26.1 |

* cited by examiner

*Primary Examiner* — Sai Aung
(74) *Attorney, Agent, or Firm* — Lee & Hayes, PLLC

(57) ABSTRACT

In some cases, a provisioned electronic device may receive a request for configuration information from an unprovisioned device. In response, the provisioned device may determine configuration information to send to the unprovisioned device based at least in part on the contents of the request. Examples of configuration information may include network credentials for connecting to a wireless local area network, a registration token that identifies the unprovisioned device to a fulfillment service, and user preferences associated with a user of the provisioned device. Further, the provisioned device may send the configuration information to the unprovisioned device. Upon receipt of the configuration information, the unprovisioned device may utilize the configuration information to order products from the fulfillment service. In some instances, the provisioned device may obtain the configuration information from the fulfillment service.

20 Claims, 9 Drawing Sheets

PEER-TO-PEER CONFIGURATION

BACKGROUND

Traditionally, wireless electronic devices have required users to manually input information for the devices to have Wi-Fi access. For example, users had to input network password to access a secured network. In some other examples, users have to manually input user account information for a service provider to associate the electronic device with a user profile. Improvements in device technology require new ways to configure devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
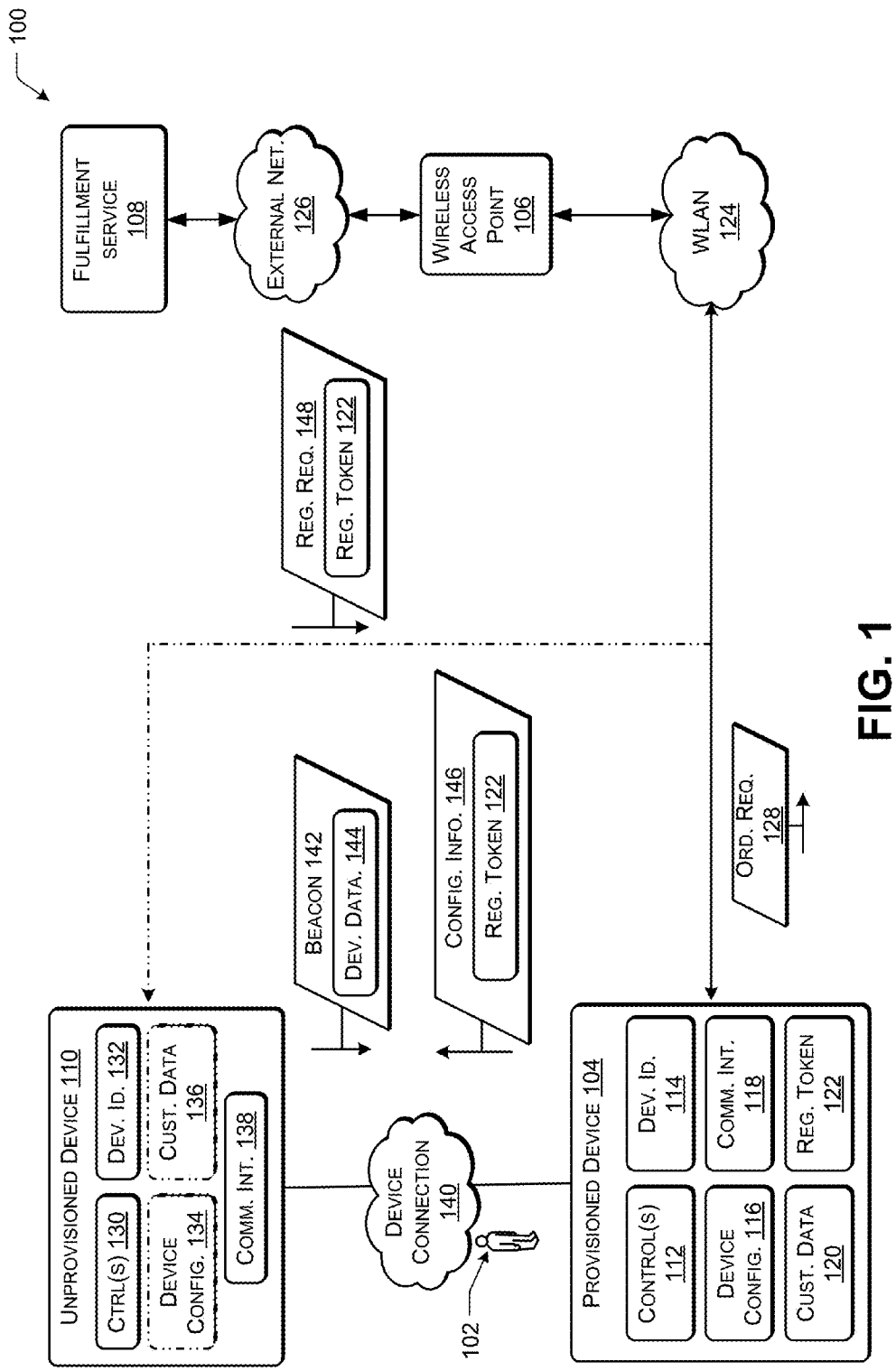
FIG. 1 illustrates an example framework for providing configuration information to an unprovisioned device within a fulfillment environment, according to some implementations.

This disclosure includes, in part, techniques and arrangements for configuring an electronic device ("unprovisioned device") to order products from a fulfillment service within a cloud fulfillment environment (e.g., a retail fulfillment environment) in an at least partially automated manner to reduce effort by a user during the configuration. In some cases, the electronic device of the present disclosure may not include a keyboard, a touchscreen, or other input device for a user to manually input configuration information to the electronic device. Accordingly, the present disclosure describes utilizing a provisioned device operable to order products from a fulfillment service to provide at least some of the configuration information to the unprovisioned device. The provisioned device may determine that the electronic device is in an unprovisioned device state, and send the electronic device the configuration information to enable the electronic device communicate with the fulfillment and to order products from the fulfillment service.

In some cases, a user may direct the provisioned device and the unprovisioned device to enter into a partner device configuration mode for transferring the configuration information. For example, the unprovisioned device may enter the partner device configuration mode based at least in part on the user selecting a control of the unprovisioned device. Once the unprovisioned device enters the partner device configuration mode, the unprovisioned device may broadcast a configuration beacon requesting configuration information. Similarly, the provisioned device may enter the partner device configuration mode based at least in part on the user selecting a control of the provisioned device. Once the provisioned device enters the partner device configuration mode, the provisioned device may receive and process the configuration beacon from the unprovisioned device. In some examples, the provisioned device and the unprovisioned device may establish an encrypted communication channel in partner device configuration mode.

In some examples, the configuration information may include network credentials for accessing a wireless local area network. For instance, the network credentials may include alphanumeric characters and/or other symbols representing a service set identifier (SSID) and/or a password associated with a particular wireless access point (WAP). In addition, the configuration information may user account information associated with the user. For instance, the user account information may include one or more tokens identifying the user within the fulfillment environment.

Further, once the unprovisioned device receives the network credentials, the unprovisioned device may utilize the network credentials to access the wireless local area network. In addition, the unprovisioned device may send, to the fulfillment service via the wireless local area network, a registration token received from the provisioned device. Upon receipt of the registration token, the fulfillment service may generate one or more associations between the unprovisioned device and the user. Further, the fulfillment service may provide the unprovisioned device with a security token that identifies the unprovisioned to the fulfillment service. Upon receipt of the security token, the unprovisioned device may enter a provisioned device mode for ordering items from the fulfillment service for delivery via the wireless local area network.

In some examples, a fulfillment service may provide configuration information to the unprovisioned device via the provisioned device. For instance, the provisioned device may send a configuration request to the fulfillment service on behalf of the unprovisioned device. In response to the configuration request, the fulfillment service may determine configuration information associated with the unprovisioned device. For instance, the fulfillment service may determine user preferences for the unprovisioned device based at least in part on user account information associated with the user. Further, the fulfillment service may send a configuration response to the provisioned device including the user preferences. Upon receipt of the user preferences, the provisioned device may send the user preferences to the unprovisioned device.

FIG. 1 illustrates an example framework 100 for configuring an unprovisioned device, according to some implementations. FIG. 1 shows illustrative interactions between a user 102, a provisioned device 104, a wireless access point (WAP) 106, a fulfillment service 108, and an unprovisioned device 110, when performing various operations, including configuring the unprovisioned device 110 to order products for delivery within the fulfillment environment. Some examples of the provisioned device 104 and/or unprovisioned device 110 may include smart phones and mobile devices; desktop, terminal and workstation computing devices; laptop and netbook computing devices; digital media devices and eBook readers; tablet computing devices; televisions; gaming systems; home electronic devices; automotive electronic devices; routing devices and access points; and any other device capable of collecting information and communicating the information to the fulfillment service 108.

The provisioned device 104 may be operable to allow the user 102 to order products (e.g., toiletries, groceries, and/or other consumable items) for home delivery. The provisioned device 104 may include one or more controls 112 (e.g., buttons) associated with products that the fulfillment service 108 may deliver. The provisioned device 104 may also include a device identifier 114, a device configuration 116, a communication interface 118, customer data 120, and/or a registration token 122.

To illustrate, selection of a particular control 112 by the user 102 may include user 102 actuation of a button, trigger, or switch. For example, selection of the control 112 may include depression of a physical button of the provisioned device 104. In some instances, the controls 112 may be operably mounted within the electronic device 104 to move between a rest position and an actuated position when depressed. In addition, the electronic device 104 may have a single button, or multiple buttons.

Further, the one or more controls 112 may be individually marked with labels that indicate to the user 102 a product associated with the particular control of the provisioned device 104. In some cases, the label may be may be any textual or graphical indicia that can be displayed on a monitor or display screen, a sticker, indicia on a housing, printed paper, and so forth. There may be one label for each corresponding control, or fewer labels than controls. In other implementations, the controls may be differentiated from one another in other ways, such as through color coding, shape, or texture.

The device identifier 114 may be an identifier individually assigned to provisioned device 104. Typically, but not necessarily, the provisioned device 104 may store its device identifier 114 in a memory component of the provisioned device 104. The device identifier 114 may be assigned during manufacturing of the provisioned device 104, or the provisioned device 104 may be assigned the device identifier 114 post manufacturing during a configuration process.

The device configuration 116 may include one or more settings that facilitate the operation of the provisioned device 104 within the fulfillment environment. In some examples, the device configuration 116 may include connection information associated with the fulfillment service 108. For example, the device configuration 116 may specify an address (e.g., Internet Protocol Address, Web Address, Port, etc) of the fulfillment service 108 and/or one or more protocols that may be used to communicate with the fulfillment service 108.

In some other examples, the device configuration 116 may include connection information used by the provisioned device 104 to establish a wireless connection with the WAP 106. For example, the connection information may include network credentials, such as a service set identification (SSID) for a wireless local area network (WLAN) 124 provided by the WAP 106, a password associated with the WLAN 124, and an encryption method associated with the WLAN 124 and/or WAP 106.

The communication interface(s) 118 may include one or more interfaces and hardware components for enabling communication with various other devices, such as the unprovisioned device 110, fulfillment service 108 or other computing devices, over the external network(s) 126 and/or another network. For example, communication interface(s) 118 may facilitate communication through one or more of the Internet, cable networks, cellular networks, wireless networks (e.g., Wi-Fi, cellular) and wired networks. Further, the provisioned device 104 and the fulfillment service 108 may communicate via the communication interface 118 using any combination of suitable communication and networking protocols, such as Internet protocol (IP), transmission control protocol (TCP), hypertext transfer protocol (HTTP), cellular or radio communication protocols, and so forth.

The customer data 120 may include customer order information (e.g., order history, customer account information, etc.). Further, the customer data 120 may include a security token that may be used as an authentication credential to identify the provisioned device 104 within the fulfillment environment. In addition, the customer data 120 may include user preferences associated with the user 102 of the provisioned device 104. As used herein, a user preference may refer to any information that could be used to customize or personalize the function of the provisioned device 104. For instance, the user preferences may include graphical, audio, and textual indicia associated with operation of the provisioned device 104. For example, a user preference may include the indicia provided by the provisioned device 104 in response to successful submission of the order request 128. In some instances, the user 102 may explicitly select a user preference. Additionally, and alternatively, the provisioned device 104 and/or the fulfillment service 108 may automatically select user preferences based at least in part on usage patterns and/or habits of the user 102.

As illustrated in FIG. 1, the provisioned device 104 is connected to a WLAN 124 provided for by the WAP 106. For example, the user 102 may have manually set one or more network credentials as device configuration 116 of the provisioned device 104, thereby allowing the provisioned device 104 to join the WLAN 124. Given that the provisioned device 104 has joined the WLAN 124, the provisioned device 104 is able to communicate with other devices that have joined that WLAN 124.

Further, the WAP 106 is configured to connect devices that have joined the WLAN 124 to external devices using an external network 126. In some cases, the external network 126 may be a publicly accessible network of linked networks, possibly operated by various distinct parties, such as the Internet. In other embodiments, the external network 126 may include a private network, personal area network ("PAN"), local area network ("LAN"), wide area network ("WAN"), cable network, satellite network, etc. or some combination thereof, each with access to and/or from the Internet.

As illustrated in FIG. 1, the fulfillment service 108 may be connected to the external network 126. Therefore, the provisioned device 104 and the fulfillment service 108 may communicate via the external network 126. For instance, the provisioned device 104 may send an order request 128 to the fulfillment service 108 in response to the user 102 selecting one of the controls 112 of the provisioned device 104.

As illustrated in FIG. 1, the unprovisioned device 110 may include one or more controls 130 (e.g., buttons) associated with products that the fulfillment service 108 may deliver to the user 102, a device identifier 132, device configuration 134, customer data 136, and a communication interface 138. The controls 130 may be the same or similar as the controls 112, such as a single physical button control. As described herein, the device configuration 134 and/or the customer data 136 may be incomplete thus rendering the unprovisioned device 110 temporarily incapable of ordering the products associated with the controls 130.

For instance, suppose the user 102 has newly acquired the unprovisioned device 110 and introduced the unprovisioned device 110 to the fulfillment environment. The unprovisioned device 110 may be incapable of ordering products for home delivery due to the state of the device configuration 134 and/or customer data 136. For example, the device configuration 134 may not include the network credentials required to join the WLAN 124. In some other instances, the customer data 120 may not include account information required to identify the user 102 to the fulfillment service 108. Therefore, the fulfillment service 108 may not be able to charge a customer account associated with the user 102 or deliver the requested products to a delivery address associated with the user 102.

However, the provisioned device 104 and the unprovisioned device 110 may be able to communicate with one another via a device connection 140. The device connection 140 may include short-range or near-field networks (e.g., Bluetooth®), infrared signals, personal area network ("PAN") (e.g., IEEE 802.15.4/ZigBee®, Z-Wave®, etc), cellular networks, radio, Wi-Fi networks, cable network, satellite network, the Internet, image sensor communication networks, audio communication networks, and so forth. For instance, the provisioned device 104 and unprovisioned device 110 may be able to communicate directly with one another using Wi-Fi Direct™ and/or Wi-Fi Protected Setup as promulgated by the Wi-Fi Alliance.

As illustrated in FIG. 1, the unprovisioned device 110 may send a beacon 142 that includes device data 144 to the provisioned device 104 via the device connection 140. For example, the unprovisioned device 110 may broadcast a beacon 142 over the device connection 140 using the communication interface 138. The device data 144 may include the device identifier 132, information associated with device configuration 134, information associated with the incomplete customer account data 136, and system information associated with the unprovisioned device 110 (e.g., device type, device manufacturer, model number, manufacturer, version number, installed software, etc.). In some examples, the unprovisioned device 110 may request specific information based at least in part on the device configuration 134 and customer data 136. For instance, unprovisioned device 110 may determine one or more settings that have not been configured. Further, the beacon 142 may include a request for the one or more settings.

For example, the device data 144 may include information requesting network credentials for connecting to the WLAN 124. As another example, the device data 144 may include information identifying that the customer data 120 of the unprovisioned device 110 does not include one or more tokens that may be used to identify the unprovisioned device 110 to the fulfillment service 108.

In some examples, the unprovisioned device 110 may send the beacon 142 in response to the unprovisioned device 110 entering a partner device configuration mode for obtaining configuration information. In some examples, the unprovisioned device 110 may enter the partner device configuration mode in response to input by the user 102 to the unprovisioned device 110. For instance, the unprovisioned device enter a partner device configuration mode based on the user 102 pressing one or more of the controls 130 of the unprovisioned device 110 for a specified period of time (e.g., 5 seconds). Additionally, and alternatively, the unprovisioned device 110 may enter the partner device configuration mode based at least in part on determining that the device configuration 134 and incomplete customer account data 136 are rendering the unprovisioned device 110 inoperable. For instance, in response to the user 102 pressing the one or more of the controls 130 of the unprovisioned device 110, the unprovisioned device 110 may determine that the unprovisioned device 110 does not have wireless access (e.g., the unprovisioned device has not joined the WLAN 124). As a result, the unprovisioned device 110 may broadcast the beacon 142 using the communication interface 138.

Upon receipt of the beacon 142, the provisioned device 104 may determine configuration information 146 for the unprovisioned device 110 based at least in part on the device data 144. In some instances, the provisioned device 104 may further determine configuration information 146 based at least in part on a level of trust established with the unprovisioned device 110. For example, if the provisioned device 104 has authenticated the unprovisioned device 110, the provisioned device 104 may send sensitive configuration information 146 to the unprovisioned device 110. As another example, if the provisioned device 104 has not authenticated the unprovisioned device 110, the provisioned device 104 may limit the content of the configuration information 146 to a minimal level that will permit normal functioning of the unprovisioned device 110.

Further, the provisioned device 104 may send the configuration information 146 to the unprovisioned device 110. For example, the provisioned device 104 may determine that the device configuration 134 of the unprovisioned device 110 does include the network credentials for the WLAN 124 based upon the device data 144 in the beacon 142. Further, the provisioned device 104 may determine the network credentials for the WLAN 124 based at least in part on the device configuration 116, and send the network credentials as configuration information 146 to the unprovisioned device 110.

In another example, the provisioned device 104 may determine that the customer data 136 of the unprovisioned device 110 does not include a security token based upon the device data 144 in the beacon 142. As a result, the provisioned device 104 may send the registration token 122 to the unprovisioned device 110. In yet still another example, the provisioned device 104 may determine one or more user preferences associated with the user 102. Further, the provisioned device 104 may send the user preferences to the unprovisioned device 110 as configuration information 146.

In some examples, the provisioned device 104 may process the beacon 142 in response to the provisioned device 104 entering a partner device configuration mode for providing configuration information to the unprovisioned device 110. The provisioned device 104 may enter the partner device configuration mode based at least in part on input by the user 102 to the provisioned device 104. For instance, the provisioned device 104 may process the beacon 142 based on the user 102 pressing one or more of the controls 112 of the provisioned device 104 for a specified period of time (e.g., 5 seconds). In some other examples, the provisioned device 104 may enter the partner device configuration mode based at least in part on receiving the beacon 142.

While the provisioned device is in the partner device configuration mode, the provisioned device may be prevented from sending order request 128 to the fulfillment service 108. Further, once the provisioned device sends the configuration information 146 to the unprovisioned device 110, the provisioned device 104 may return to its normal operation mode. In some other examples, the provisioned device 104 may return to the mode based at least in part on input by the user 102 to provisioned device 104. For instance, the provisioned device 104 may return to its normal operation mode based on the user 102 pressing one or more of the controls 112 of the provisioned device 104 for a specified period of time (e.g., 5 seconds). In yet still another example, the provisioned device 104 may return to its normal operation mode (e.g., provisioned device mode) after a predetermined period of time or a message from the unprovisioned device 110 confirming receipt of the configuration information 146.

In some examples, the provisioned device 104 may disconnect from the WLAN 124 when it enters the partner device configuration mode. Further, once the provisioned device 104 has disconnected from the WLAN 124, the provisioned device 104 may establish the device connection 140 with the unprovisioned device 110. For instance, the provisioned device 104 may disconnect the communication interface 118 from the WLAN 124, and form device connection 140 with the unprovisioned device 110 using the communication interface 118. In addition, the provisioned device 104 may reconnect to the WLAN 124 after the device connection 140 is established or in response to the provisioned device 104 exiting the partner device configuration mode.

Upon receipt of the configuration information 146, the unprovisioned device 110 may update the device configuration 134 and/or customer data 136 based at least in part on the contents of the configuration information 146. Further, the unprovisioned device 110 may enter a normal operation mode (e.g., provisioned device mode) for ordering products for delivery within the fulfillment environment. Alternatively, if the unprovisioned device 110 does not receive the configuration information 146 after a predetermined period of time (e.g., 30 seconds) the unprovisioned device 110 may exit the partner device configuration mode, and enter an unprovisioned device mode.

For example, the unprovisioned device 110 may update the device configuration 134 to include the network credentials associated with the WLAN 124 based at least in part on the configuration information 146. As a result, the unprovisioned device 110 may be operable to join the WLAN 124 and communicate with the fulfillment service 108 via the external network 126. Further, the unprovisioned device 110 may send a registration request 148 (i.e., registration signal) to the fulfillment service 108. The registration request 148 may include the registration token 122 and the device identifier 132 of the unprovisioned device 110. Once the fulfillment service 108 receives the registration request 148, the fulfillment service 108 may register the unprovisioned device 110 to the user 102. Thus, the unprovisioned device 110 may be operable to order products for delivery within the fulfillment environment.

Figure 2:
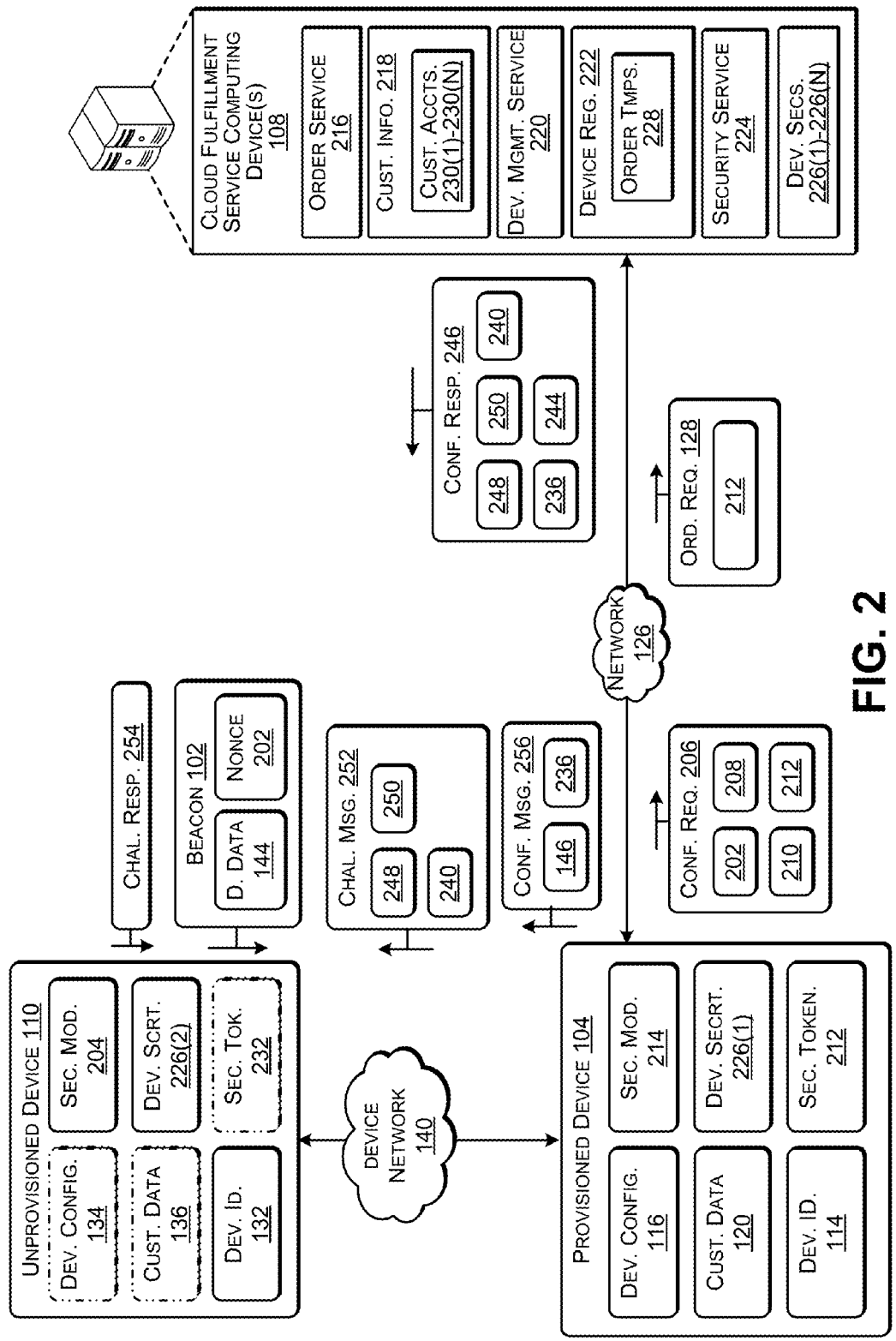
FIG. 2 illustrates an example framework for providing configuration information to an unprovisioned device within a fulfillment environment, according to some implementations.

FIG. 2 illustrates an example framework 200 for managing an electronic device, according to some implementations. FIG. 2 shows illustrative interactions between the provisioned device 104, the unprovisioned device 110, and the fulfillment service 108 when performing various operations, including configuring the unprovisioned device 110 to order products for delivery within the fulfillment environment.

In the illustrative example of FIG. 2, the unprovisioned device 110 sends the beacon 142 to the provisioned device 104 over the device connection 140. In some instances, the unprovisioned device 110 may send the beacon 142 based at least in part on input to the unprovisioned device 110. For example, the unprovisioned device 110 may send the beacon 142 to the provisioned device 104 in response to the user 102 (not shown in FIG. 2) pressing one or more of the controls 112 (not shown in FIG. 2) of the unprovisioned device 110 for a specified period of time (e.g., 5 seconds). Further, the unprovisioned device 110 or the provisioned device 104 may provide audio and/or visual feedback to the user 102 to indicate successful transmission of the beacon 142 to the provisioned device 104. As shown in FIG. 2, the beacon 142 may include the device data 144 and a cryptographic nonce 202. The cryptographic nonce 202 may include an arbitrary value, such as a number or a string. In some instances, the cryptographic nonce 202 may be configured to be valid for a limited period of time or for a limited scope of use. As described in detail herein, the cryptographic nonce 202 may allow unprovisioned device 110 to determine whether information received from the provisioned device 104 corresponds to the beacon 142.

As illustrated in FIG. 2, the unprovisioned device 110 may include a security service 204 for performing cryptographic functions. For instance, the security service 204 may generate the cryptographic nonce 202 using a random or pseudo random number generator. Some example cryptographic functions may include cryptographic hash functions (e.g., message digest algorithm ("MD5"), secure hash algorithm-1 ("SHA-1"), secure hash algorithm-2 ("SHA-2"), secure hash algorithm-3 ("SHA-3"), etc.), one-way functions, public private key encryption functions, symmetric key encryption, authentication handshakes, etc.

Upon receipt of the beacon 142, the provisioned device 104 may generate a configuration request 206. Further, the provisioned device 104 may send the configuration request 206 to the fulfillment service 108 via the external network 126. The configuration request 206 may include the cryptographic nonce 202, request parameters 208, a configuration information hash 210, and a security token 212 that may be used as an authentication credential to identify the user 102 and/or provisioned device 104 to the fulfillment service 108. Further, the order request 128 may include the security token 212 as information identifying the provisioned device 104, the user 102, and/or an associated order item to the fulfillment service 108.

As illustrated in FIG. 2, the provisioned device 104 may include a security service 214 for performing cryptographic functions. For instance, the security service 214 may generate the configuration information hash 210 by performing a hash function on the configuration information 146. Some example cryptographic functions may include cryptographic hash functions, one-way functions, public private key encryption functions, symmetric key encryption, authentication handshakes, etc.

In some embodiments, the provisioned device 104 may determine particular information required to render the unprovisioned device 110 operable to order products from the fulfillment service 108. Further, the provisioned device 104 may determine whether the device configuration 116 and/or customer data 120 includes the particular information. In some cases, if the provisioned device 104 is unable to provide the particular information, the provisioned device 104 may send the configuration request 206 to the fulfillment service 108 for the particular information. For example, the provisioned device 104 may include request parameters 208 representing the particular information in the configuration request 206.

For example, if the provisioned device 104 determines that the unprovisioned device 110 requires a security token, the provisioned device 104 may include a request parameter 208 requesting a security token for the unprovisioned device 110 in the configuration request 206. As another example, if the provisioned device 104 determines that the unprovisioned device 110 lacks the necessary firmware and/or drivers to connect to the external network 126, the provisioned device 104 may include a request parameter 208 requesting one or more files to update the firmware or drivers of the unprovisioned device 110.

The fulfillment service 108 may include an order service 216, customer information 218, a device management service 220, a device registry 222, and a security service 224. The order service 216 may receive order requests from electronic devices within the fulfillment environment. For instance, when the provisioned device 104 is in a normal operation mode, the provisioned device may send the order request 128 (not shown in FIG. 2) to the fulfillment service. Upon receipt of an order request 128, the order service 216 may retrieve an order template 228 associated with the control 112 of the provisioned device 104 from the device registry 222. In some examples, the order template 228 may include a mapping between the provisioned device 104, one or more product identifiers, and an identifier of customer information 218. In addition, the order template 228 may include additional purchase information, such as an order quantity, product size, applicable discounts, applicable coupons, and so on. Further, each order template 228 may be associated with a control of individual electronic devices within the fulfillment environment. In some examples, the fulfillment service 108 may generate elements of the order template 228 after the manufacture of electronic devices within the fulfillment environment. In some other instances, the device management service 220 may generate elements of the order template 228 during the registration of an electronic device.

Once the order service 216 retrieves the order template 132, the order service 216 may initiate the shipment of one or more products associated with the one or more product identifiers to the user 102 associated with the order template 228. Further, the order service 216 may determine a customer account 230 associated with the user 102 within the customer information 218 based at least in part on an identifier of the customer account 230 included in the order template 228. Each user within the fulfillment environment may be associated with a respective customer account 230. For example, the user 102 may be associated with a first customer account 230(1). Further, other users may be associated with other customer accounts 230(N). The customer accounts 230 may include customer account identifiers, customer profiles, customer preferences, login information (e.g., customer names and passwords) to the fulfillment service 108, full names, email addresses, shipping addresses, billing addresses, credit card accounts, bank accounts, rewards accounts, electronic devices registered to the customer account, and customer purchase history. In addition, the order service 216 may bill the customer accounts 230 for the purchase of the one or more products associated with the one or more product identifiers.

The security service 224 may be operable to perform cryptographic techniques. In some examples, the techniques may include authentication, and/or encryption/decryption (e.g., asymmetric, symmetric, hash generation, digital signature generation, message authentication code generation). Further, the security service 224 may manage device specific secrets 226 associated with individual electronic devices (e.g., the provisioned device and unprovisioned device). For instance, a first device specific secret 226(1) may include data that is known to the provisioned device 104 and the fulfillment service 108, and a second device specific secret 226(2) may include data that is known to the unprovisioned device 110 and the fulfillment service 108. In some other instances, the device specific secrets 226 may be information associated with data known to individual electronic devices (e.g., the provisioned device 104 and unprovisioned device 110). For example, the device specific secret 226(1) may be a public-key certificate associated with a private-key certificate of the provisioned device 104. In some examples, the device specific secrets 226 may include data stored to the electronic devices (e.g., the provisioned device 104, the unprovisioned device 110, etc.) during manufacture. Additionally, and alternatively, a device specific secret 226 may be associated with a group of electronic devices within the fulfillment environment. For example, a group specific secret may be associated with a plurality of devices delivered to an entity.

In the illustrative example of FIG. 2, the provisioned device 104 may send the configuration request 206 to the fulfillment service 108. In some examples, user 102 input may trigger the sending of the configuration request 206 to the fulfillment service 108. For instance, the configuration request 206 may be sent to the fulfillment service 108 based at least in part on the user 102 pressing the control 112 of the provisioned device 104 for a specified period of time (e.g., 5 seconds), and the provisioned device 104 receiving a beacon 142 from the unprovisioned device 110.

Upon receipt of the configuration request 206, the fulfillment service 108 may register the unprovisioned device 110 to the customer account 230(1) based on the security token 212 and the device identifier 134 of the unprovisioned device 110. For example, the device management service 220 may generate a security token 232, which uniquely identifies the unprovisioned device 110 within the fulfillment environment. In addition, the device management service 220 may generate one or more order templates 228 in the device registry 222. Further, the order templates 228 may include a mapping between the newly generated security token 232 and the customer account 230(1) associated with the security token 232.

In addition, the device management service 220 may update the customer account 230(1) to indicate that the unprovisioned device 110 is registered to the user 102. For instance, the device management service 126 may update a customer profile associated with the customer account 230(1) to include information indicating that the device identifier 132 and/or the security token 232 represent the unprovisioned device 110.

In some examples, the fulfillment service 108 may register the unprovisioned device 110 based upon identifying a pre-existing association between the provisioned device 104 and the unprovisioned device 110. For example, the customer account 230 may include information indicating that the provisioned device 104 and the unprovisioned device 110 have been purchased from a common merchant, were shipped to the same delivery address, have been paid for with a common method of payment, and so forth. In some instances, a level of trust assigned to the security token 232 may be based upon the identification of a pre-existing association. For instance, if the device management service 220 determines that the provisioned device 104 and unprovisioned device 110 were shipped to the same address, the device management service 220 may assign a higher level of trust to the security token 232. In some examples, the level of the trust of the security token 232 may be used when determining whether an order request associated with security token 232 should be fulfilled without additional authentication and/or authorization steps. In some other examples, the level of the trust of the security token 212 of the provisioned device 104 may be used to determine whether the provisioned device 104 is permitted to register the unprovisioned device 110. In yet still some other examples, the level of the trust of the security token 212 of the provisioned device 104 may be used to determine the level of trust for the security token 232 of the unprovisioned device 110 registered by the provisioned device 104.

Further, the device management service 220 may determine configuration information 234 based at least in part on the request parameters 208, information associated with the user 102, and/or the device identifier 132. For example, the device management service 220 may generate configuration information 234 including security settings for the unprovisioned device 110 based on request parameters 208 requesting security information associated with the software of the unprovisioned device 104. In another example, the configuration information 234 may be based at least in part on information associated with the customer account 230, such as one or more user 102 preferences, purchase history associated with the user 102, etc. Additionally, the security service 224 may sign the configuration information 234 to generate signed configuration information 236.

In addition, the security service 224 may generate a challenge 238. In some examples, the challenge 238 may be based at least in part on the device specific secret 226 associated with the unprovisioned device 110, and thus is specific to the unprovisioned device 110. In some instances, the security service 214 may cryptographically sign the challenge 238 to form a signed challenge 240. In addition, the security service 224 may generate an expected challenge response 242 to the signed challenge 240. Further, the security service 224 may cryptographically sign the expected challenge response 242 to form a signed expected challenge response 244.

In some examples, the challenge 238 may include a cryptographic nonce. For instance, the security service 214 may employ a cryptographically secure random number generator to generate the cryptographic nonce. Further, the expected challenge response 242 may be the result of the performing a function with the cryptographic nonce and the device specific secret 226 as inputs. In some examples, the function may include a cryptographic hash function (e.g., message digest algorithm ("MD5"), secure hash algorithm-1 ("SHA-1"), secure hash algorithm-2 ("SHA-2"), secure hash algorithm-3 ("SHA-3"), etc.). Further, the device management service 220 may generate a configuration response 254. The configuration response 246 may include the signed challenge 240, the signed expected challenge response 244, and the signed configuration information 236. Once the configuration response 254 has been generated, the fulfillment service 108 may send the configuration response 254 to the provisioned device 104 via the external network 126.

In some examples, the security service 224 may sign the cryptographic nonce 202 to generate a signed cryptographic nonce 248, and sign the configuration information 146 to generate a signed configuration information hash 250. Further, the configuration response 246 may include the signed cryptographic nonce 248 and/or the signed configuration information hash 250.

As illustrated in FIG. 2, the fulfillment service 108 may send the configuration response 246 to the provisioned device 104 via the external network 126. Further, the security service 214 of the provisioned device 104 may verify the cryptographic signatures associated with the configuration response 246. For example, the provisioned device 104 may determine that the fulfillment service 108 was the source of the signed cryptographic nonce 248, the signed configuration information hash 250, the signed challenge 240, and/or the signed expected response 246 based at least in part on well known digital signature techniques.

Once the provisioned device 104 has verified the contents of the configuration response 246, the provisioned device 104 may send a challenge message 252 to the unprovisioned device 110. The challenge message 252 may include the signed cryptographic nonce 248, the signed configuration information hash 250, and the signed challenge 240. Upon receipt of the challenge message 252, the unprovisioned device 110 may verify the contents of the challenge message 252. For instance, the unprovisioned device 110 may verify that the signed cryptographic nonce 248 corresponds to the cryptographic nonce 202 originally generated by the unprovisioned device 110, and that the cryptographic nonce 202 is still valid. Further, the unprovisioned device 110 may verify that signed cryptographic nonce 248 was generated by the fulfillment service 108.

In addition, the unprovisioned device 110 may generate a challenge response 144 to the signed challenge 238. In some examples, the unprovisioned device 110 may generate the challenge response 254 based at least in part on the device specific secret 226(2) associated with the unprovisioned device 110. Next, the unprovisioned device 110 may send the challenge response 254 to the provisioned device 104. Further, the provisioned device 104 may match the challenge response 254 to the expected challenge response 242. If the challenge response 254 corresponds to the expected challenge response 242, the provisioned device 104 may send a configuration message 256 that includes the configuration information 146 and the configuration information 234 to the unprovisioned device 110.

Upon receipt of the configuration message 256, the unprovisioned device 110 may verify the configuration information 146 and confirmation information 234. Once the configuration information 146 and the configuration information 234 are verified, the unprovisioned device 110 may update the device configuration 134 and/or customer data 136 based at least in part on the configuration information 146 and the configuration information 234. Further, the unprovisioned device 110 may enter a normal operation mode for ordering products for delivery within the fulfillment environment. For example, the configuration information 146 may include network credentials for the WLAN 124. Accordingly, the unprovisioned device 110 may update the device configuration 134 using the network credentials to allow the unprovisioned device 110 to access the WLAN 124.

Figure 3:
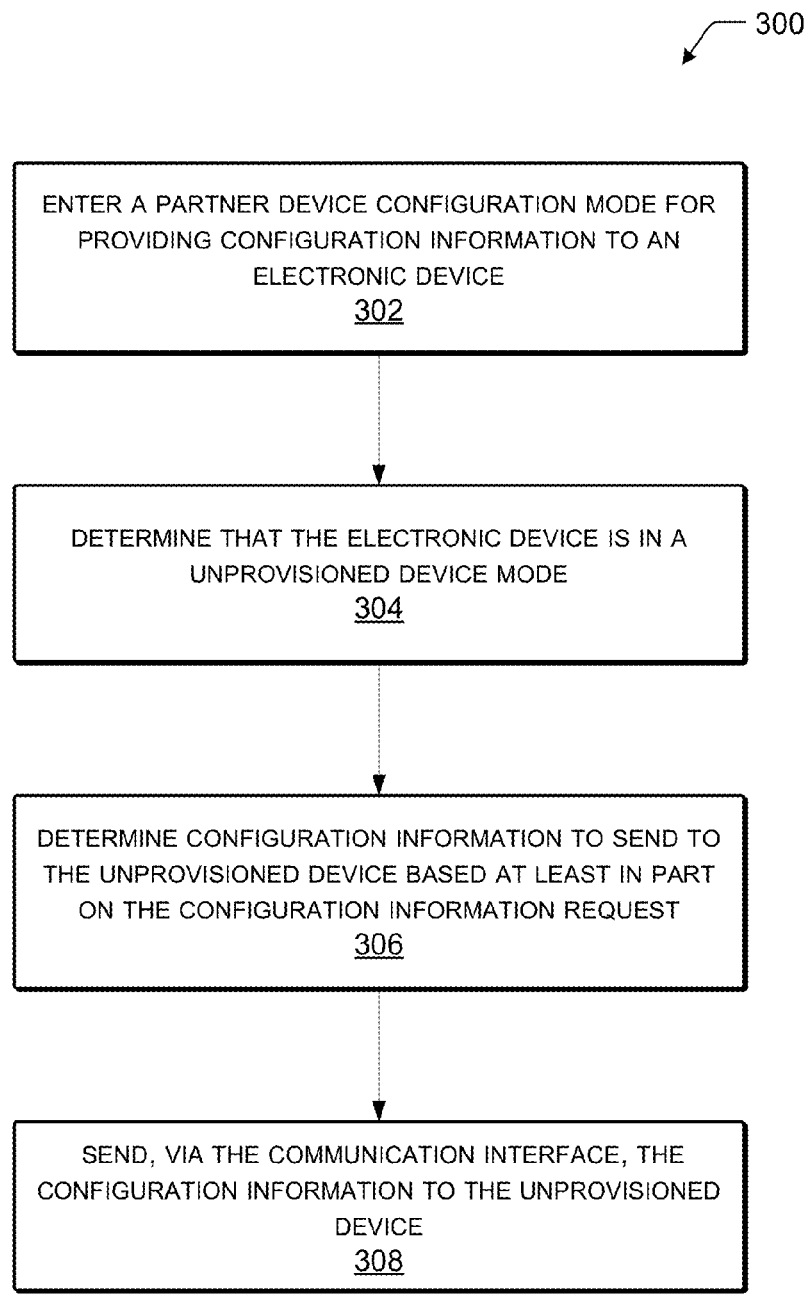
FIG. 3 is a flow diagram illustrating an example process for providing configuration information to an unprovisioned device according to some implementations.

FIG. 3 illustrates a process 300 for providing configuration information to an unprovisioned device by a provisioned device according to some implementations. The process 300 is illustrated as a collection of blocks in a logical flow graph, which represent a sequence of operations that can be implemented in hardware, software, or a combination thereof. The blocks are referenced by numbers 302-308. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 302, a provisioned device may enter a partner device configuration mode for providing configuration information to an electronic device. For example, the provisioned device 104 may enter the partner device configuration mode based at least in part on a user of the provisioned device 104 pressing the control 112 of the provisioned device 104. Further, the provisioned device 104 may establish a connection between the provisioned device 104 and the unprovisioned device 110 in the partner device configuration mode. For instance, the provisioned device 104 may establish the device connection 140 with the unprovisioned device 110 via a Wi-Fi Direct enabled radio or a Bluetooth radio. In some examples, the provisioned device 104 may disconnect from the WLAN 124 when it enters the partner device configuration mode in order to facilitate establishing the device connection 140 with the unprovisioned device 110. In addition, the provisioned device 104 may reconnect to the WLAN 124 after the device connection 140 is established or in response to the provisioned device 104 exiting the partner device configuration mode.

Further, the device connection 140 may be secured via encryption, such as by implementing SSL, TLS, and so forth. Additionally, and alternatively, the provisioned device 104 and the unprovisioned device 110 may perform well known authentication techniques in the partner device configuration mode.

Further, the provisioned device 110 may provide audio and/or visual feedback that indicates the current mode of the provisioned device 104. For instance, the provisioned device 104 may provide audio and/or visual feedback indicating that the provisioned device 104 is in the provisioned device mode. In addition, the provisioned device 104 may provide audio and/or visual feedback indicating that provisioned device 104 is entering the partner device configuration mode. Further, the provisioned device 104 may provide audio and/or visual feedback indicating that the provisioned device 104 has returned to the provisioned device mode when the provisioned device 104 exits the partner device configuration mode.

For example, the unprovisioned device 104 may provide one or more visual cues using a light source (e.g., light emitting diodes (LEDs)). As another example, the unprovisioned device 110 may play one or more audio files. In yet still another example, the unprovisioned device 104 may include an electrophoretic display (e.g., E-INK electronic paper) and/or a liquid crystal display displaying graphical information that that indicates the current mode of the provisioned device 104.

At 304, the provisioned device may determine that the electronic device is in an unprovisioned device state. For example, the provisioned device 104 may determine that the unprovisioned device 110 is an unprovisioned device state based at least in part on receiving the beacon 142 from the unprovisioned device 110. In some examples, the beacon 142 may include a request for particular configuration information from the provisioned device 104.

At 306, the provisioned device may determine configuration information to send to the electronic device. In some examples, the provisioned device 104 may determine the configuration information 146 based at least in part on the device data 144 included in the beacon 142. For instance, the provisioned device 104 may compare the device data 144 to the device configuration 116 and/or the customer data 120, and determine one or more incomplete portions of the device data 144. In some other examples, the provisioned device 104 may determine configuration information 146 based at least in part on a description of the unprovisioned device 110 in the device data 144. For example, the provisioned device 104 may determine the configuration information 146 based at least in part on the hardware and/or firmware associated with the unprovisioned device 110 as described in the device data 144.

At 308, the provisioned device may send, via the communication interface, the configuration information to the unprovisioned device. For example, once the provisioned device 104 has determined the configuration information 146, the provisioned device 104 may send the configuration information 146 to the unprovisioned device 110. In some instances, the configuration information 116 may include a registration token 122. Further, the provisioned device 104 may assign a level of trust to the registration token 122. For instance, if the provisioned device 104 has authenticated the unprovisioned device 110, the provisioned device 104 may assign a higher level of trust to the registration token 122. In some examples, the level of trust may correspond to the type of authentication employed by the provisioned device 104 with respect to the unprovisioned device 110. For instance, the level of trust of the registration token 122 may be higher if two-factor authentication was performed.

Additionally, and alternatively, the provisioned device 104 may broadcast the configuration information 146 based at least in part on entering the partner device configuration mode. For example, in response to the user 102 pressing one or more of the controls 112 of the unprovisioned device 110 for a specified period of time, the provisioned device 104 may broadcast the configuration information 146 (e.g., network credentials) for a predetermined period of time without receiving a beacon from the unprovisioned device 110. Further, the provisioned device 104 may provide audio and/or visual feedback to the user 102 to indicate successful transmission of the configuration information 146.

In some other instances, the provisioned device 104 may transmit configuration information 146 without entering the partner device configuration mode. For example, in response to the user 102 pressing one or more of the controls 110 of the provisioned device 104, the provisioned device 104 may broadcast the configuration information 146 before sending out the order request 128.

Figure 4:
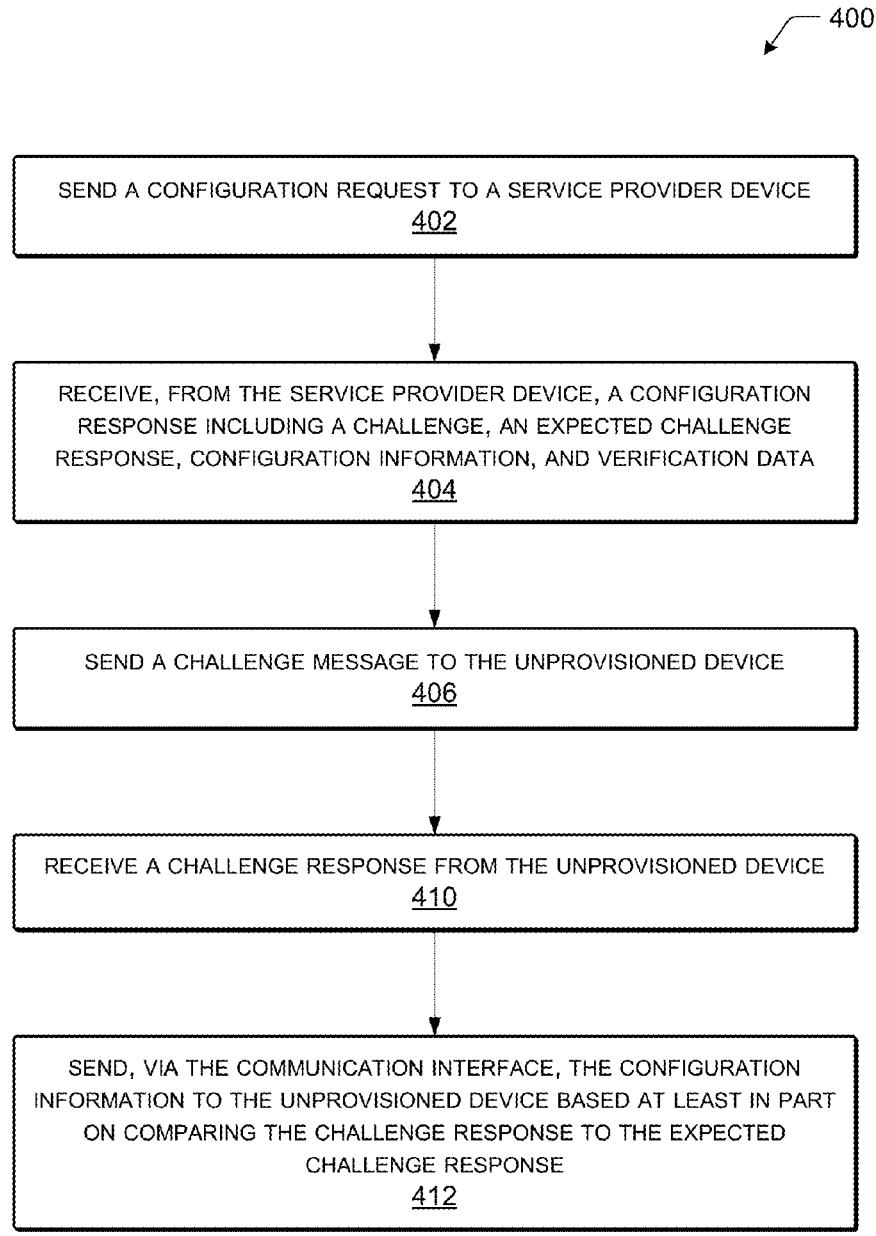
FIG. 4 is a flow diagram illustrating an example process for receiving configuration information from a service provider according to some implementations.

FIG. 4 illustrates a process 400 for receiving configuration information from a service provider according to some implementations. In some examples, the service provider may include the fulfillment service 108. In some other examples, the service provider may include a device that provides one or more services to and/or for a client device. For instance, the service provider may provide digital content (e.g., audio, video, electronic game, electronic books, software application, etc) to a client device. Further, the service provider may be accessible via a local network, a private network, personal area network ("PAN"), and/or an external network (e.g. the Internet).

The process 400 is illustrated as a collection of blocks in a logical flow graph, which represent a sequence of operations that can be implemented in hardware, software, or a combination thereof. The blocks are referenced by numbers 402-412. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 402, the provisioned device may send a configuration request to a service provider device. For example, the provisioned device 104 may enter the partner device configuration mode based at least in part on the user 102 pressing the control 112 of the provisioned device 104 for a specified period of time. Further, the provisioned device 104 may receive the beacon 142 from the unprovisioned device 110. As a result, the provisioned device may generate and send the configuration request 206 to the fulfillment service. In some examples, the configuration request 206 may include information associated with the provisioned device 104 and the unprovisioned device 110. For instance, the configuration request 206 may include the security token 212 associated with the provisioned device 104 and the device data 144 associated with the unprovisioned device 110.

Further, the unprovisioned device 110 may provide audio and/or visual feedback that indicates that the current mode of the unprovisioned device 110. For instance, the unprovisioned device 110 may provide audio and/or visual feedback indicating that the unprovisioned device 110 is in the unprovisioned device mode. In addition, the unprovisioned device 110 may provide audio and/or visual feedback indicating that unprovisioned device 110 is entering the partner device configuration mode. Further, the unprovisioned device 110 may provide audio and/or visual feedback indicating that the unprovisioned device 110 has entered the provisioned device mode when the provisioned device 104 has successfully configured the unprovisioned device 110.

For example, the unprovisioned device 104 may provide one or more visual cues using a light source (e.g., light emitting diodes (LEDs)). As another example, the unprovisioned device 110 may play one or more audio files. In yet still another example, the unprovisioned device 104 may include an electrophoretic display (e.g., E-INK electronic paper) and/or a liquid crystal display displaying graphical information that indicates the current mode of the unprovisioned device 110.

At 404, the provisioned device may receive, from the service provider device, a configuration response including a signed challenge, a signed expected challenge response, signed configuration information, and verification data. In some examples, the verification data may include the signed cryptographic nonce 248 and the signed configuration information hash 250.

At 406, the provisioned device may send a challenge message to the unprovisioned device 110. In some examples, the challenge message 252 may include the signed cryptographic nonce 248, the signed configuration information hash 250, and the signed challenge 240. In some cases, the provisioned device 104 may send the challenge message 252 to the unprovisioned device 110 based at least in part on the verifying the verification data.

At 410, the provisioned device may receive a challenge response from the unprovisioned device. At 412, the provisioned device may send, via the communication interface, a configuration message to the unprovisioned device based at least in part on comparing the challenge response to the expected challenge response. For example, if the challenge response 254 corresponds to the expected challenge response 242, the provisioned device 104 may send a configuration message 256 include the configuration information 146 and the configuration information 234 to the unprovisioned device 110.

Figure 5:
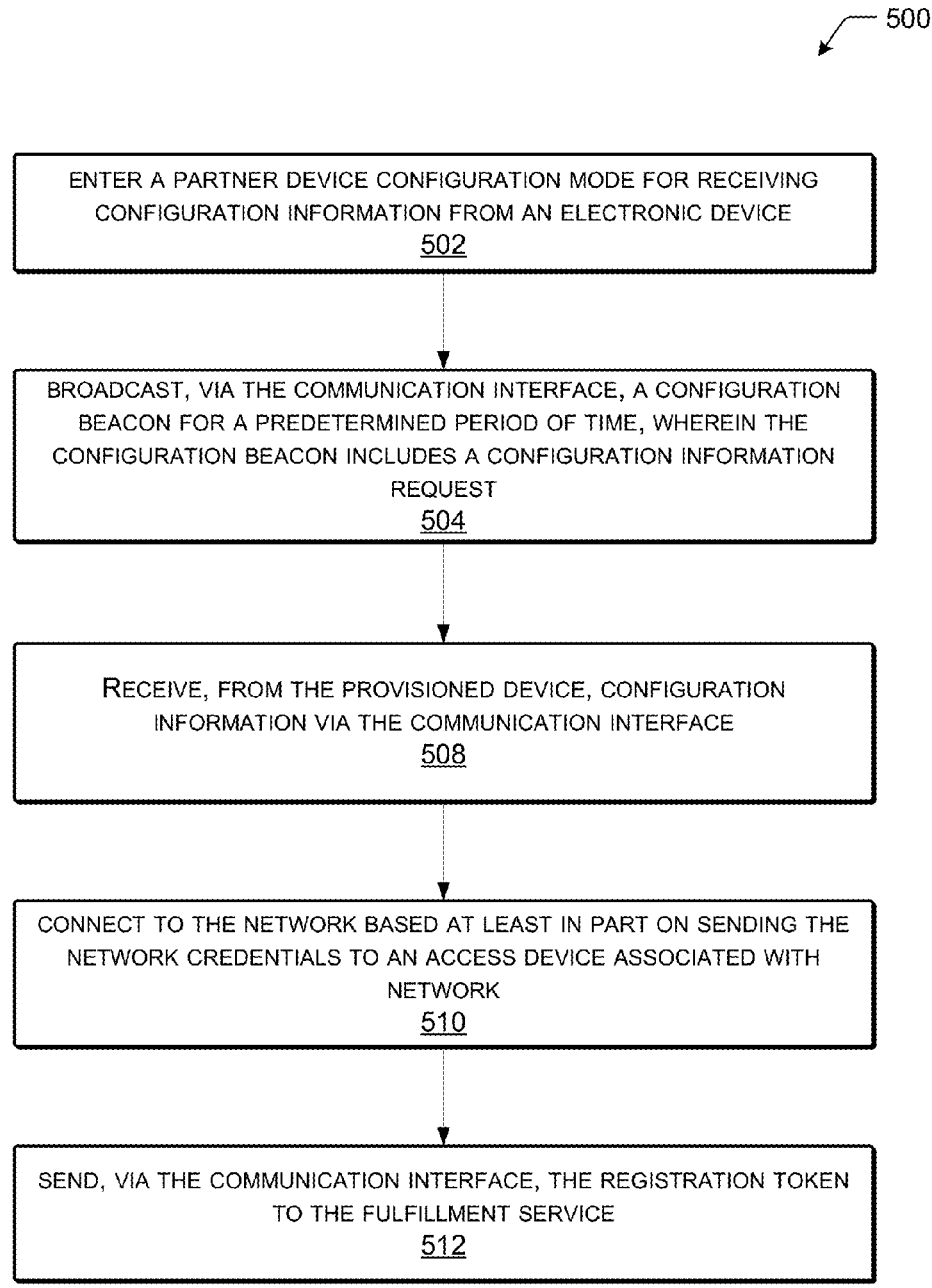
FIG. 5 is a flow diagram illustrating an example process for receiving configuration information from a provisioned device according to some implementations.

FIG. 5 illustrates a process 500 for requesting configuration information within a fulfillment system according to some implementations. The process 500 is illustrated as a collection of blocks in a logical flow graph, which represent a sequence of operations that can be implemented in hardware, software, or a combination thereof. The blocks are referenced by numbers 502-510. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 502, the unprovisioned device 110 may enter a partner device configuration mode for receiving configuration information from an electronic device. For example, the unprovisioned device 110 may enter into the partner device configuration mode based at least in part on the user 102 pressing the control of the unprovisioned device 110. In some instances, the unprovisioned device 110 may enter the partner device configuration mode based at least in part on determining that the unprovisioned device 110 is in an unprovisioned device mode. Additionally, and alternatively, the unprovisioned device 110 may determine that the device configuration 134 and incomplete customer account data 136 are rendering the unprovisioned device 110 inoperable. For instance, in response to the user 102 pressing the one or more of the controls 112 of the unprovisioned device 110, the unprovisioned device 110 may determine that the unprovisioned device 110 does not have wireless access (e.g., the unprovisioned device has not joined the WLAN 124). In response, the unprovisioned device 110 may enter the partner device configuration mode.

At 504, the unprovisioned device may send a configuration beacon to the provisioned device, wherein the configuration beacon includes device data. For instance, the unprovisioned device 110 may broadcast the beacon 142 for five seconds. In some other instances, the unprovisioned device 110 may establish a connection with the provisioned device 104 when the provisioned device 104 is in a partner device configuration mode. Further, the connection may be secured via encryption, such as by implementing SSL, TLS, and so forth. Additionally, and alternatively, the provisioned device 104 and the unprovisioned device 110 may perform well known authentication techniques in the partner device configuration mode.

At 506, the provisioned device may receive, from the provisioned device, configuration information via the communication interface. For example, the provisioned device 104 may receive, via the communication interface 118, network credentials for connecting to the WLAN 124 and the registration token 122.

At 508, the unprovisioned device may connect to a network based at least in part on sending the network credentials to an access device associated with an external network. At 510, the unprovisioned device may send, via the communication interface, the registration token to the fulfillment service 108.

Figure 6:
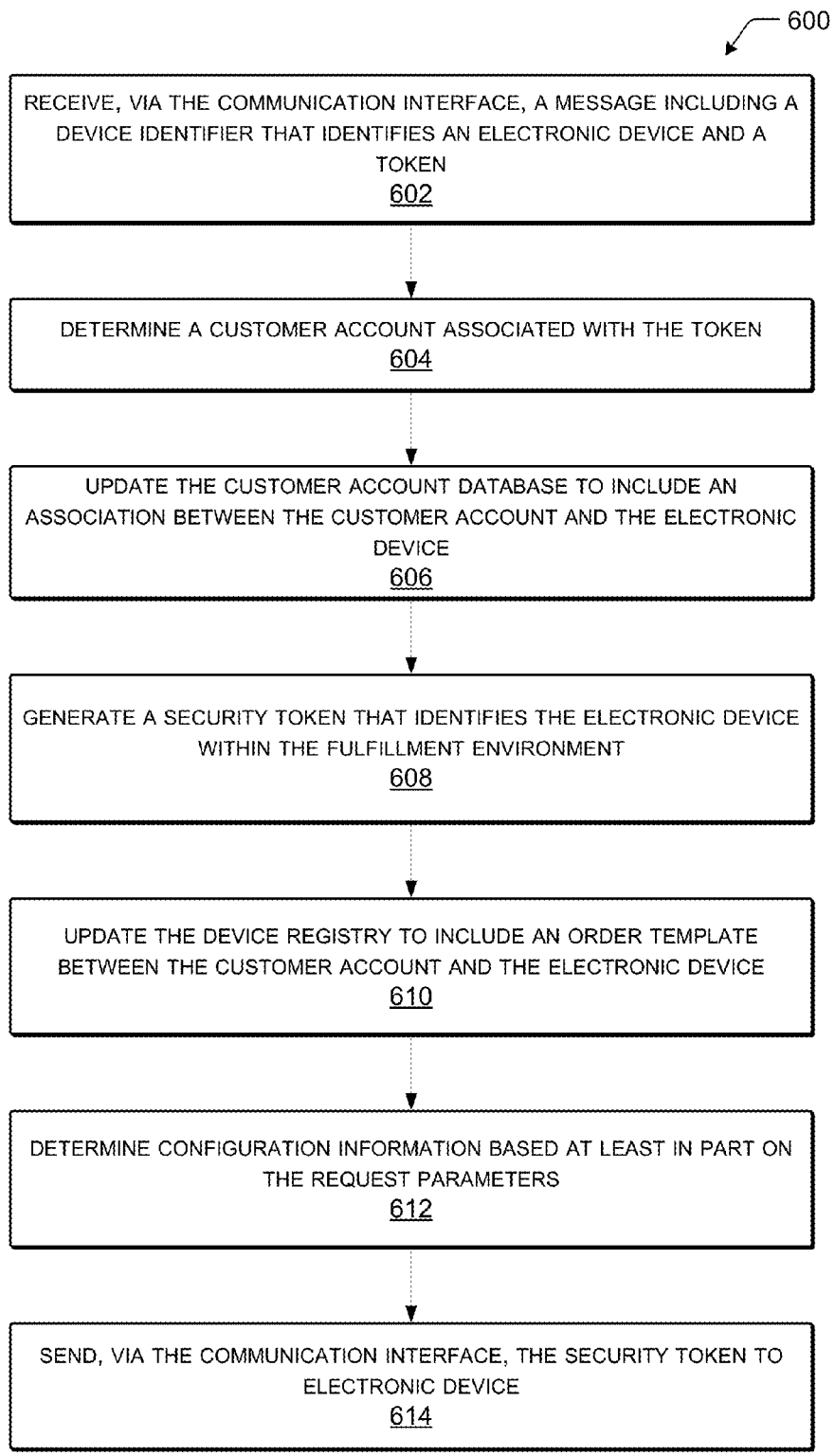
FIG. 6 is a flow diagram illustrating an example process for registering an unprovisioned device within a fulfillment environment according to some implementations.

FIG. 6 illustrates a process 600 for registering an electronic device with a fulfillment service within a fulfillment environment according to some implementations. The process 600 is illustrated as a collection of blocks in a logical flow graph, which represent a sequence of operations that can be implemented in hardware, software, or a combination thereof. The blocks are referenced by numbers 602-614. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 602, the fulfillment service may receive, via the communication interface, a message including a device identifier that identifies an electronic device, a token, and/or one or more request parameters. For example, the fulfillment service 108 may receive the registration request 148 from the unprovisioned device 110. Further, the registration request 148 may include the device identifier 132 of the unprovisioned device 110, the registration token 122 associated with the provisioned device 104, and one or more request parameters representing missing configuration information that may render the unprovisioned device 110 operable to order products within the fulfillment environment. In another example, the fulfillment service 108 may receive the configuration request 206 from the provisioned device 104. The configuration request 206 may include the security token 212 that identifies the provisioned device 104, the device identifier 132 of the unprovisioned device 110, and one or more request parameters representing missing configuration information that may render the unprovisioned device 110 operable to order products within the fulfillment environment.

At 604, the fulfillment service may determine a customer account associated with the token. In some examples, the device management service 126 may identify the customer account 230(1) associated with registration token 122. In some other examples, the device management service 220 may identify the customer account 230(1) associated with registration token 122. In some embodiments, the fulfillment service may further determine a level of trust associated with token. In addition, the fulfillment service may require additional authentication steps based in part on the level of trust. For example, the device management service may receive a registration token 122 with a lower level of trust. In response, the fulfillment service 108 may take additional steps to authenticate the unprovisioned device 110 and/or confirm the registration of the unprovisioned device 110 to the user 102. For instance, the fulfillment service 108 may send a message to an e-mail address associated with the customer account 230(1) requesting confirmation of the registration of the unprovisioned device 110.

At 606, the fulfillment service may update the customer account database to include an association between the customer account and the electronic device. For instance, the device management service 220 may update the customer account 230(1) associated with the user 102 to indicate that the unprovisioned device 110 is registered to the user 102. In some examples, the device management service 220 may update the customer accounts 230 based at least in part on a predetermined period of validity of the registration token 122.

At 608, the fulfillment service may generate a security token that identifies the electronic device within the fulfillment environment. For example, the device management service 220 may generate the security token 232 associated with the unprovisioned device 110 based at least in part on a secret of the fulfillment service 108. In some examples, the device management service 220 may associate a level of trust to the security token. Further, the level of trust may be based at least in part on information associated with the registration token 122 or security token 232.

At 610, the fulfillment service may update the device registry to include an order template between the customer account and the electronic device. For example, the device management service 220 may store one or more order templates 228 including the security token 232 and an identifier of the customer account 230(1). Therefore, when the fulfillment service 108 receives an order request that includes the security token 232 from the unprovisioned device 110, the fulfillment service 108 may determine the order template 228 to use when generating an order by identifying the order template 228 associated with the security token 232.

At 612, the fulfillment service may determine configuration information based at least in part on the request parameters. For example, if the request parameters represents a request for user preferences associated with the user 102, the device management service 220 may identify user preferences associated with user 102 based at least in part on the customer account 230(1). For instance, the device management service 220 might determine that the unprovisioned device 110 has audio capabilities, and identify a preferred sound to play when an order request 128 is successful based at least in part on information included in the customer profile. In another example, the request parameters 208 may include a request for updated firmware. As a result, the device management service 220 may generate configuration information 234 including the most recent firmware for the unprovisioned device 110. In some instances, the selection of the firmware may be based at least in part on other devices associated with user 102. For example, the selection of the firmware or a portion of the firmware may be based at least in part on the WAP 126.

At 614, the fulfillment service may send, via the communication interface, the security token and the configuration information to electronic device. For example, when the fulfillment service has received the registration request 148 from the unprovisioned device, the fulfillment service may send a registration response including the security token 232 and configuration information 234 to the unprovisioned device 110. Alternatively, when the fulfillment service has received the configuration request 206 from the provisioned device 104, the fulfillment service 108 may send the configuration response 246 to the provisioned device 104. In addition, if the device management service 220 determines that the registration token 122 is not valid, the registration response or the configuration response may not include the security token 116. Instead, the registration response may indicate that the registration attempt is unsuccessful. Similarly, the configuration response 246 may indicate that the registration attempt is unsuccessful if the security token 116 included in the configuration request 206 is not valid.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 7:
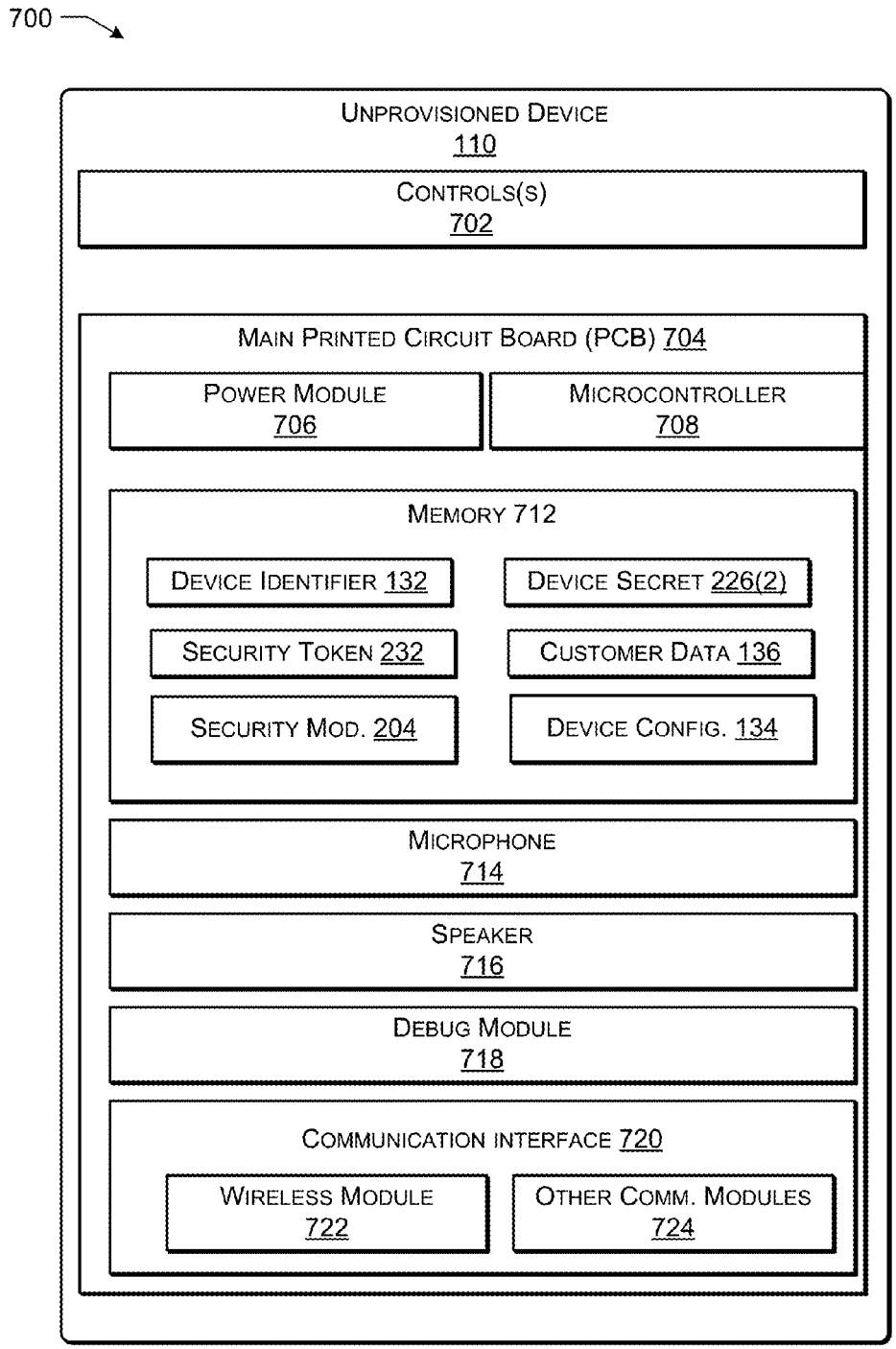
FIG. 7 illustrates select components of an example electronic device, according to some implementations.

FIG. 7 illustrates select electronic components of an electronic device, such as the unprovisioned electronic device 110, which are generally designated as 700. The device 700 includes one or more controls 702 and a main printed circuit board (PCB) 704. When a user selects a control 702 (e.g., a control selection), a signal is generated and a power module 706 powers up the main PCB 704. The power module 706 may be electrically connected to a microcontroller 708 on the main PCB 704. In a particular embodiment, the microcontroller 708 may include one or more processors with embedded memory (e.g., a 1 MB Flash memory) and static random-access memory (SRAM), such as a 122 KB static SRAM. In some other examples, the microcontroller 708 may include one or more microprocessors, and/or one or more application processors.

FIG. 7 further illustrates that the microcontroller 708 may be connected to one or more light sources 710, such as light emitting diodes (LEDs), that may be illuminated to provide visual feedback. FIG. 7 further illustrates that the microcontroller 708 may be communicatively coupled to a memory 712 (e.g., serial flash memory) that is used to store any number of data and/or applications depending upon implementation. As a basic implementation, the memory 712 stores at least the device identifier 132, device configuration 134, customer data 136, device specific secret 226(2) and security token 232 and may further store, in a multiple control implementation, one or more control identifiers associated with one or more controls. In addition, the memory 712 may store various sound files, one or more audio files, and programs to be executed by the microcontroller, and so on. In addition, a microphone 714 may be mounted on the PCB 704 and electrically coupled to the microcontroller 708. Further, a speaker 716 may be coupled to the microcontroller 708 to provide audio feedback or play audio files.

A programming/debug module 718 is provided to facilitate configuration and debugging of the device 700. The programming/debug module 718 may be implemented to receive instructions from a remote management device (e.g., fulfillment service 108 and/or the provisioned device 104) to program the various controls for associated products and other order information.

A communication interface 720 is also implemented by the device 700. In some examples, the communication may include a wireless module 722 (e.g., a Wi-Fi module). The wireless module 722 may include hardware, such as an Institute of Electrical and Electronics Engineers (IEEE) 802.11b/g/n single band (e.g., 2.4 GHz) radio that may communicate via a single antenna. The wireless module 722 may be activated to establish a wireless connection (e.g., with the wireless access point (WAP) 216). In some cases, the microcontroller 708 may be configured to activate the wireless module 722 in order to establish a wireless connection with the WAP 216 based on the connection information 214 that may be stored in the memory 714. After establishing the wireless connection, information stored in the memory 714 (e.g., one or more audio files, one or more device identifiers, or combination thereof) may be communicated to a fulfillment service and/or provisioned device 104 for processing.

Further, the communication interface 720 may include other communication modules 724 configured to use communications protocols and channels which differ from that used by the wireless module 722. For instance, the other communication modules 724 may be configured to communicate using short-range or near-field networks (e.g., Bluetooth®), infrared signals, personal area network ("PAN") (e.g., IEEE 802.15.4/ZigBee®, Z-Wave®, etc), cellular networks, radio, optics, audio, ultrasound, visual indicia, Radio-frequency identification, and so forth. The other communication modules 724 may be activated to establish the device connection 140 between the provisioned device 104 and unprovisioned device 110.

Figure 8:
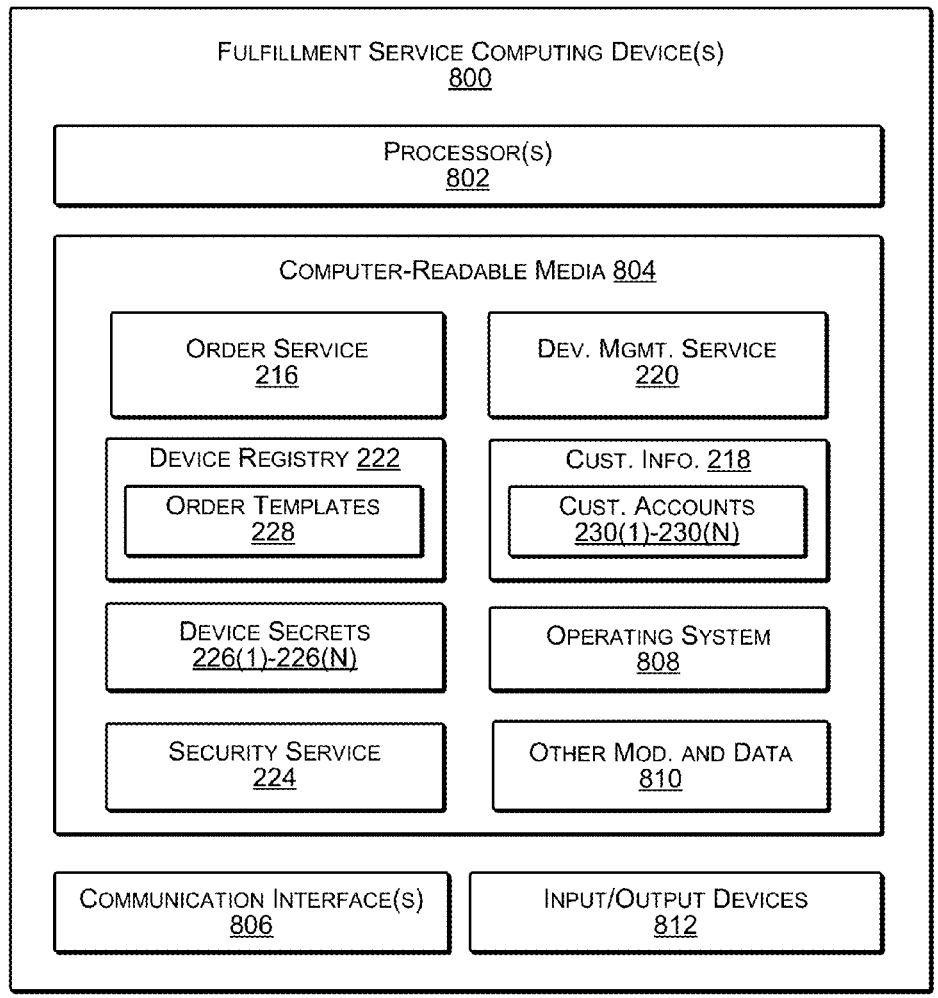
FIG. 8 illustrates select components of an example fulfillment service device, according to some implementations.

FIG. 8 illustrates select components of the fulfillment service computing device 800 that may be used to implement some functionality of the fulfillment service 108 described herein. The fulfillment service computing device 800 may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the fulfillment service computing device 800 as being present in a single location, these components and data may alternatively be distributed across different computing devices and different locations in any manner. Consequently, the functions may be implemented by one or more service computing devices, with the various functionality described herein distributed in various ways across the different computing devices. Multiple fulfillment service computing devices 104 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, each fulfillment service computing device 800 may include one or more processors 802, one or more computer-readable media 804, and one or more communication interfaces 806. Each processor 802 may be a single processing unit or a number of processing units, and may include single or multiple computing units or processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. Such computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the fulfillment service 108, the computer-readable media 804 may be any type of computer-readable storage media and/or may be any tangible non-transitory media to the extent that non-transitory computer-readable media exclude media such as energy, carrier signals, electromagnetic waves, and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed herein to the fulfillment service 108. In addition, the computer-readable media 804 may store data used for performing the operations described herein. In the illustrated example, the computer-readable media 804 may store the customer information 218, the device registry 222, and the device specific secrets 226.

In the illustrated example, the functional components stored in the computer-readable media 804 may include the order/reorder service 216, the device management service 220, and the security service 224. Additional functional components stored in the computer-readable media 804 may include an operating system 808 for controlling and managing various functions of the fulfillment service 108. The fulfillment service computing device 800 may also include or maintain other functional components and data, such as other modules and data 810, which may include programs, drivers, etc., and the data used or generated by the functional components. Further, the fulfillment service 108 may include many other logical, programmatic and physical components, of which those described above are merely examples that are related to the discussion herein.

The communication interface(s) 806 may include one or more interfaces and hardware components for enabling communication with various other devices, such as the provisioned device 104, or other computing devices, over the network(s) 226. For example, communication interface(s) 806 may facilitate communication through one or more of the Internet, cable networks, cellular networks, wireless networks (e.g., Wi-Fi, cellular) and wired networks. As several examples, the fulfillment service 108 and the provisioned 104 may communicate and interact with one another using any combination of suitable communication and networking protocols, such as Internet protocol (IP), transmission control protocol (TCP), hypertext transfer protocol (HTTP), cellular or radio communication protocols, and so forth.

The fulfillment service computing device 800 may further be equipped with various input/output (I/O) devices 812. Such I/O devices 812 may include a display, various user interface controls (e.g., controls, joystick, keyboard, mouse, touch screen, etc.), audio speakers, connection ports and so forth.

Figure 9:
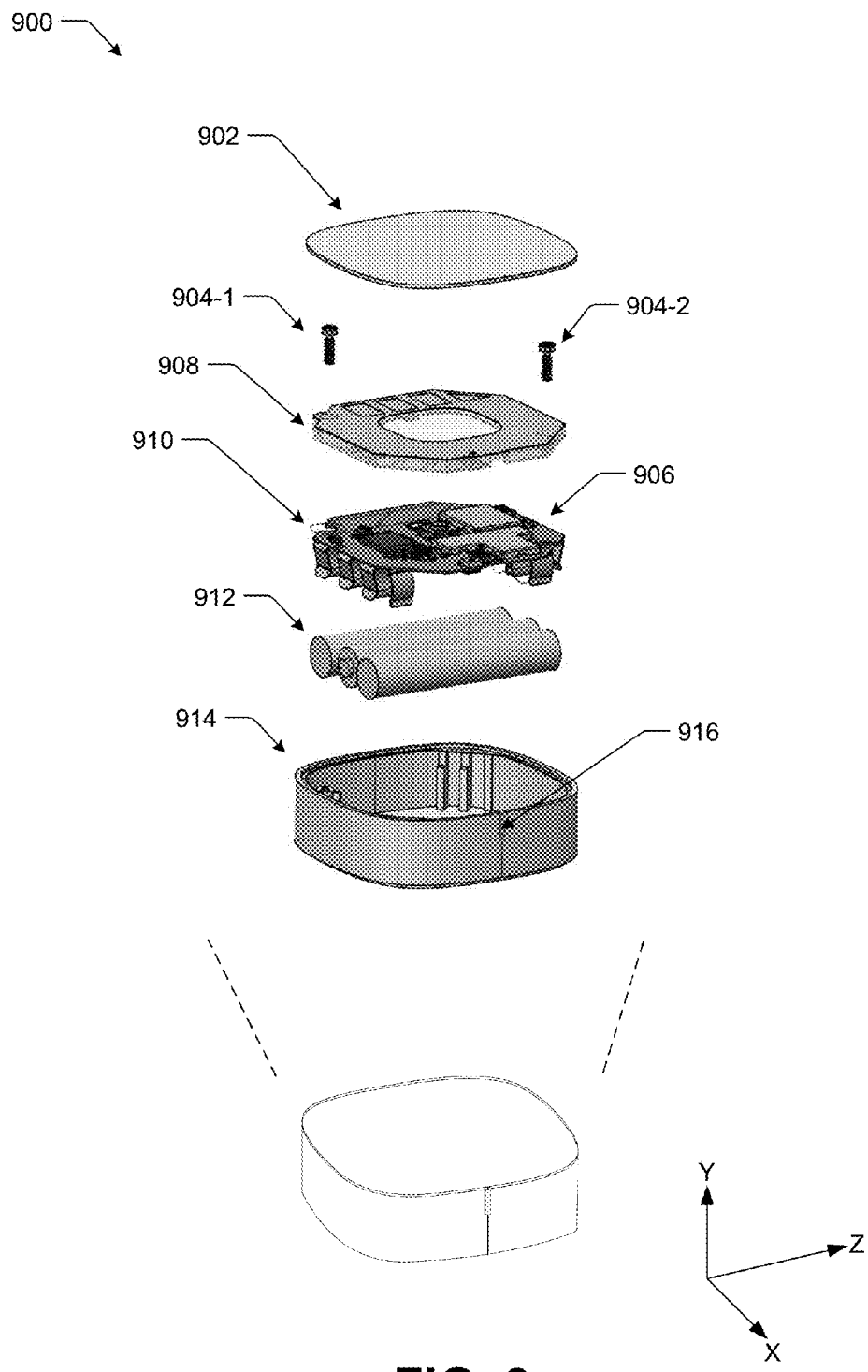
FIG. 9 illustrates an exploded view of select components of an example electronic device, according to some implementations.

FIG. 9 illustrates an exploded view of select components of an example electronic device 900, such as the provisioned device 104 and the unprovisioned device 110. The electronic device 900 includes the button 902, one or more screws 904 (e.g., self-threading screws), such as a first screw 904-1 and a second screw 904-2, an adhesive 906 (e.g., double sided self-adhesive tape), a spacer 908, a main printed circuit board (PCB) 910, such as main printed circuit board 704, one or more batteries 912 (e.g., three AAAA batteries are shown), a housing 914, and the light pipe 916.

The button 902 may be implemented as a physical button that is physically movable between a first or rest position when the button is not actuated and a second or actuated position when the button is depressed. In other implementations, the button may be a physical button that responds to touch, but does not move. In still other implementations, the button 902 may be implemented as a soft button on a display that may be actuated by touch. For instance, the button 902 may include a force sensor with haptic feedback.

The housing 914 has a substantially cuboidal shape and encloses the electronics of the main PCB 910, batteries 912, and spacer 908. In some examples, when assembled, the electronic device 900 may be substantially rectangular-shaped in an X-Y plane, with dimensions of about 49 mm×14 mm. The electronic device 900 may have a Z-axis dimension of about 49 mm. FIG. 9 further illustrates that the structure of the housing 914 may have an opening, such as the light pipe 916.

In the example illustrated, the button 902 may be attached to the spacer 908 by an adhesive 906. The screws 904 may be used to attach the spacer 908 and the main PCB 910 to the housing 914. The spacer 908 and button 902 allow some physical movement with respect to the underlying PCB 906 so that the button may move between a rest position and an actuated position. When the button 902 is depressed, it or the spacer 908 makes contact with an electronic switch or detection sensor on the PCB 910. When contacted, the switch or sensor generates a signal that is passed to a controller on the PCB 910. The PCB uses the signal to detect when the button 902 is pressed. One particular implementation of the PCB 910 is described herein in more detail with reference to FIG. 7.

The batteries 912 may be removeably affixed to the main PCB 910. While AAAA batters are illustrated, the electronic device 502 may receive power from alternative numbers of batteries (e.g., a single battery) and/or alternative sizes of batteries (e.g., AAA size). Further, alternative types of removable batteries, such as standard primary (single-use) or secondary (rechargeable) cells, may be used.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

What is claimed is:

1. An electronic device comprising:
   one or more processors;
   a communication interface;
   a housing;
   an actuatable button operably mounted within the housing to move between a rest position and an actuated position when depressed; and
   one or more computer-readable media to store processor-executable instructions that, when executed, program the one or more processors to:
      send an order request for a product to a service provider in response to actuation of the actuatable button, wherein the order request includes a security token associated with a customer account, the customer account linked to the electronic device and the product;
      enter a partner device configuration mode to send configuration information to an unprovisioned device in response to actuation of the actuatable button for a period of time greater than a predetermined threshold;
      receive, via the communication interface, a configuration beacon from the unprovisioned device, wherein the configuration beacon includes at least a request for network credentials for a wireless local area network (WLAN) and a registration token for the service provider;
      determine configuration information to send to the unprovisioned device, wherein the configuration information includes at least the network credentials and the registration token that associates the unprovisioned device to the customer account with the service provider;
      send, via the communication interface, the configuration information to the unprovisioned device; and
      exit the partner device configuration mode.

2. The electronic device as recited in claim 1, wherein the processor-executable instructions further program the one or more processors to:
   receive, from the service provider, a configuration response including a challenge and an expected challenge response, wherein the challenge includes a cryptographic nonce and the expected challenge response is based at least in part on the cryptographic nonce and a device specific secret associated with the unprovisioned device;
   send, via the communication interface, the challenge to the unprovisioned device; and
   receive, via the communication interface, a challenge response from the unprovisioned device;
   wherein sending the configuration information to the unprovisioned device is based at least in part on comparing the challenge response to the expected challenge response.

3. The electronic device as recited in claim 1, wherein the actuatable button represents a first actuatable button, the communication interface represents a first communication interface, the housing represents a first housing, the product represents a first product, the order request represents a first order request, and the unprovisioned device comprises:
   a second communication interface;
   a second housing;
   a second actuatable button operably mounted within the second housing to move between a rest position and an actuated position when depressed, wherein the unprovisioned device is configurable to send, via the second communication interface, a second order request for a second product to the service provider in response to actuation of the second actuatable button.

4. The electronic device as recited in claim 1, wherein entering the partner device configuration mode comprises disconnecting from the WLAN; and exiting the partner device configuration mode comprises reconnecting to the WLAN.

5. A method comprising:
   sending, by a first electronic device via a communication interface, a configuration beacon for a predetermined period of time, wherein the configuration beacon includes device information;
   receiving, by the first electronic device, and from a second electronic device,
   network credentials associated with a wireless local area network;
   receiving, by the first electronic device, and from the second electronic device, a registration token associated with a service provider device;
   receiving, via the communication interface, an authentication challenge from the second electronic device;
   generating an authentication response based at least in part on a locally-stored device specific secret and the authentication challenge;
   connecting, by the first electronic device, to the wireless local area network using the network credentials; and
   sending, by the first electronic device, via the wireless local area network, a registration signal that includes the registration token to the service provider device.

6. The method of claim 5, further comprising:
   receiving, via the wireless local area network, a security token that identifies the first electronic device; and
   sending, to the service provider device, an order request for an item and the security token in response to actuation of a button.

7. The method of claim 5, further comprising:
   establishing an encrypted connection with the second electronic device using the communication interface,
   wherein the network credentials are received over the encrypted connection.

8. The method of claim 5, further comprising:
   sending, via the communication interface, the authentication response to the second electronic device; and
   receiving, via the communication interface, an encrypted hash of the network credentials,
   wherein connecting to the wireless local area network is based at least in part on comparing the network credentials to the encrypted hash of the network credentials.

9. The method of claim 5, further comprising:
   generating a first cryptographic nonce with a predetermined time of expiration,
   wherein the configuration beacon further includes the first cryptographic nonce;
   receiving, from the second electronic device, a second cryptographic nonce; and
   comparing the first cryptographic nonce to the second cryptographic nonce,
   wherein connecting to the wireless local area network is based at least in part on comparing the first cryptographic nonce to the second cryptographic nonce.

10. The method of claim 5, wherein receiving the network credentials comprises receiving, by the first electronic device, and from the second electronic device, data that includes at least one of a service set identification for the wireless local area network, a password associated with the wireless local area network, and an encryption method associated with the wireless local area network.

11. The method of claim 5, further comprising
operating the first electronic device is in an unprovisioned device mode, wherein the first electronic device does not have wireless connectivity while operating in the unprovisioned device mode.

12. A system comprising:
a first electronic device having a first device identifier and comprising a first actuatable button, a first wireless interface, a first memory, and a first controller wherein the first controller is configured to:
send an order request for a product to a computing device in response to depression of the first actuatable button, wherein the order request includes a security token associated with a customer account, the customer account linked to the first electronic device and the product;
enter a partner device configuration mode for providing configuration information to a second electronic device based at least in part on at least one of receiving a voice command or actuation of the first actuatable button for a predetermined period of time; and
receiving, via the first wireless interface, a configuration beacon from the second electronic device, wherein the configuration beacon includes device information comprising at least one of a second device identifier, a device type, and one or more unprovisioned settings.

13. The system as recited in claim 12, wherein the first controller is further configured to send the configuration information to the second electronic device, wherein the configuration information includes at least one of network credentials for connecting to a wireless local area network and a registration token associated with the computing device.

14. The system as recited in claim 13, further comprising the second electronic device having a second controller, wherein the second controller is configured to send the configuration beacon based at least in part on determining whether the second electronic device has wireless connectivity.

15. The system as recited in claim 13, wherein the order request represents a first order request, and the security token represents a first security token, and further comprising:
the second electronic device comprising a second actuatable button, a second wireless interface, a second memory, and a second controller, wherein the second controller is configured to:
connect to the wireless local area network using the network credentials;
send, via the second wireless interface, a registration signal that includes the registration token to the computing device;
receive, via the second wireless interface, a second security token that identifies the first electronic device;
enter a provisioned device mode; and
send, via the second wireless interface, a second order request to the computing device in response to actuation of the second actuatable button.

16. The system as recited in claim 13, wherein the security token represents a first security token, and further comprising:
one or more servers comprising:
a device registry that includes information linking the first device identifier to a first product and a corresponding customer identifier, and a second device identifier to a second product; and
a customer account database that includes information linking the customer identifier to customer account information;
wherein the one or more servers are programmed to:
receive, from the second electronic device, a registration signal that includes a registration token and the second device identifier;
determine the customer identifier based at least in part on the registration token;
generate a second security token that identifies the second electronic device to the one or more servers;
link the customer identifier to the second security token and the second product within at least one of the device registry and the customer account database; and
send the second security token to the second electronic device.

17. The system as recited in claim 12, further comprising:
one or more servers, wherein the one or more servers are programmed to:
receive, from the first electronic device, a configuration request that includes the device information and a security token identifying the first electronic device;
determine a device specific secret associated with the second electronic device based at least in part on the device information;
generate a challenge and an expected challenge response based at least in part on the device specific secret; and
send, to the first electronic device, a configuration response including the challenge and the expected challenge response.

18. The system as recited in claim 12, further comprising:
one or more servers, wherein the one or more servers are programmed to:
receive, from the first electronic device, a configuration request that includes the device information;
determine configuration information based at least in part on the device information and customer information associated with the security token; and
send, to the first electronic device, a configuration response including the configuration information.

19. The system as recited in claim 18, wherein the configuration information includes at least one of user preferences associated with the customer information and firmware associated with the second electronic device.

20. The method as recited in claim 5, wherein receiving the registration token associated with the service provider device comprises receiving, by the first electronic device, and from the second electronic device, the registration token that associates the first electronic device to an account with the service provider device.

* * * * *